United States Patent [19]

Krude

[11] Patent Number: 4,685,897
[45] Date of Patent: Aug. 11, 1987

[54] UNIVERSAL JOINT FOR TILT STEERING WHEEL

[75] Inventor: Werner Krude, Siegburg, Fed. Rep. of Germany

[73] Assignee: GKN Automotive Components Inc., Auburn Hills, Mich.

[21] Appl. No.: 704,400

[22] Filed: Feb. 22, 1985

[51] Int. Cl.⁴ ............................ F16D 3/20; F16D 3/23
[52] U.S. Cl. ...................................... 464/141; 464/112
[58] Field of Search .............. 464/120, 122, 139, 141, 464/143, 906, 145, 112

[56] References Cited

U.S. PATENT DOCUMENTS

| | | | |
|---|---|---|---|
| 1,887,106 | 11/1932 | Shierk | 464/120 |
| 2,117,706 | 5/1938 | Cutting | 464/122 |
| 2,910,845 | 11/1959 | Wahlmark | 464/141 |
| 3,424,473 | 1/1969 | Morgan | 464/906 X |
| 3,802,221 | 4/1974 | Kimata | 464/141 |
| 3,879,960 | 4/1975 | Welschof et al. | 464/145 |
| 4,156,354 | 5/1979 | Krude | 464/141 |
| 4,319,465 | 3/1982 | Ito et al. | 464/145 |
| 4,425,101 | 1/1984 | Krude | 464/141 X |

FOREIGN PATENT DOCUMENTS

| | | |
|---|---|---|
| 78168 | 5/1983 | European Pat. Off. |
| 56555 | 5/1984 | European Pat. Off. |
| 16489 | 6/1984 | European Pat. Off. |
| 125934 | 11/1984 | European Pat. Off. |
| 1063388 | 5/1954 | France ............ 464/112 |
| 49-76138 | 9/1974 | Japan ............ 464/120 |
| 566898 | 1/1945 | United Kingdom . |
| 1490670 | 11/1977 | United Kingdom . |
| 1524415 | 9/1978 | United Kingdom . |
| 1537404 | 12/1978 | United Kingdom . |
| 1549719 | 8/1979 | United Kingdom . |
| 2115521 | 2/1982 | United Kingdom ............ 464/141 |
| 2115523 | 2/1982 | United Kingdom ............ 464/141 |
| 2131123 | 6/1984 | United Kingdom ............ 464/145 |
| 2155149 | 9/1985 | United Kingdom . |

Primary Examiner—Daniel P. Stodola
Attorney, Agent, or Firm—Remy J. VanOphem

[57] ABSTRACT

A universal joint of the type utilizing spherical roller balls to transmit torque or power between an inner joint member and an outer joint member. The balls roll in a recess in the inner joint member and each ball rolls in a rectilinear recess in the outer joint member, with such rolling action permitting and resulting from the articulation of the joint. Each recess in the outer joint member has at least a major portion that has a radial extent, from the central axis of the joint, that follows a curvilinear configuration to provide a maximum radial extent when the inner and outer joint members are aligned, through a gradually reducing radial extent as the joint is articulated, in order to provide a substantial constant depth of penetration of each ball into its outer joint member recess throughout the range of articulation of the joint. This helps to maintain the elements of the joint in contact with one another over a relatively wide range of joint articulation, to maintain free-play transmission of torque between the inner joint member and the outer joint member over this range of articulation. The joint also has complemental spherical surfaces on abutting portions of the inner and outer joint members to permit them to articulate at right angles to the axis of articulation through the outer joint recesses and to sustain end or compressive loads applied to the inner and outer joint members. The joint has particular utility as a two-ball joint in an automotive tilt-steering system.

11 Claims, 6 Drawing Figures

UNIVERSAL JOINT FOR TILT STEERING WHEEL

BACKGROUND OF THE INVENTION

1. Field of the Invention

This invention relates to a universal joint for connection drive and driven members in which the drive and driven members during operation are subject to a substantial degree of angular articulation and to compressive loads therebetween. Specifically, this invention relates to a universal joint for an automotive tilt steering system.

2. Description of the Prior Art

Various prior art patents disclose universal joints in which power or torque is transmitted from a drive member to a driven member by a plurality of spherical roller balls which are engaged partly in recesses in an inner member and partly in rectilinear recesses in an outer member, one of the inner and outer members being a part of or connected to the drive member of the joint and the other of the inner and outer members being a part of or connected to the driven member of the joint. U.S. Pat. Nos. 4,425,101 to Krude and 2,910,845 to Wahlmark illustrate such universal joints, and U.S. Pat. No. 4,156,354 to Krude illustrates a universal joint in which the torque transmitting bodies are partly spherical.

In universal joints of the type described, the centers of the balls lie in a plane which is at a right angle to the central axis of the inner member, and this plane will also be at a right angle to the central axis of the outer member when the axes of the inner and outer member are aligned. During times when the inner and outer member are not aligned, the plane of the centers of the balls will move away from its position at a right angle with respect to the central axis of the outer member, an inherent requirement and characteristic of an articulating joint, and this will cause the balls to roll in the recesses of the outer joint. However, this will reduce the distance by which one of more of the balls extends into its or their respective recesses. When the recesses are uniform in depth, as is noted in the aforesaid patents, at some point in the articulation of the joints, typically of the order of 8° in each direction from the aligned position of the joint members, the penetration of the balls in the recesses of the outer member will be reduced to the point where the joint will lose its metal to metal contact between the elements of the joint and substantial looseness will develop in the joint and will detract from the smooth operating characteristics of the joint.

Certain applications for universal joints require that the joint be capable of maintaining its smooth operating characteristics over a much wider range of articulation than the approximately 8° that can be provided by the prior art joints of the type described. For example, tilt-steering arrangements for automotive steering systems are subject to articulation of the order of approximately at least 35°, and when a universal joint is to be used in such a steering system, it must be capable of maintaining its smooth operating characteristics even when it is articularted by such a degree of magnitude. Additionally, in an automotive tilt-steering system, a universal joint is used to transmit rather low levels of torque when compared, for example, to a front wheel drive joint for an automobile. Thus, it is important that a tilt-steering universal joint be rather small and relatively inexpensive to manufacture.

U.S. Pat. No. 3,424,473 to Morgan discloses a tilt-steering system which utilizes a universal joint. Apparently, the problem of reduction of ball penetration into the recess of the outer member of the joint at high degrees of joint articulation is recognized to some extent in this patent because the ball engaging recess in the outer member of the joint, in the plane of articulation of the joint through such recess, appears to be in the configuration of the arc of a circle of a fixed radius rather than in the configuration of a straight line. U.K. Patent Application No. 2,115,523 to Krude discloses a universal joint with a curvilinear recess in the outer joint member and U.S. Pat. No. 4,070,872 to Krude discloses such an outer joint ball engaging recess configuration in a four ball universal joint. In a joint of the type depicted in the U.K. Patent Application and in U.S. Pat. No. 4,070,872, it is necessary, because of the restricted openings at the end of the outer joint members, to machine the recesses in the outer joint which adds to the cost of the universal joint when compared to a joint in which the recesses can be formed by cold forming.

The circular configuration of the outer ball engaging recesses of the universal joints of U.S. Pat. Nos. 3,424,473 and 4,070,872 does not represent an optimum or even a near-optimum configuration, however, because, as a result of torque or otherwise, one of the balls in the inner member of the joints tends to stay in contact with one of the recesses of the outer joint thereby compounding the tendency of the other ball or balls in the inner member to pull away from the top or tops of their respective recesses in the outer member of the joint during the articulation of the joint.

SUMMARY OF THE INVENTION

In accordance with the present invention there is provided a universal joint that is capable of maintaining smooth operative characteristics throughout all degrees of joint articulation, up to approximately at least 35° from the central axis of the joint, sufficient to be utilized in an automotive tilt-steering arrangement. The universal joint is made up of inner and outer joint members and a plurality of spherical roller balls that are engaged partly in recesses in the inner member and partly in recesses in the outer member. Each of the balls is free to roll in each of the recesses in which it is engaged, and the rolling of the balls in the recesses of the outer member permits and results for the articulation of the joint members with respect to one another. Each of the recesses of the outer member has at least a portion which has a curvilinear shape in the plane extending along the axis of the movement of the ball in such recess in a manner which will provide for a substantially constant depth of penetration of the ball in such recess during the articulation of the joint. even when any other ball has fully penentrated into its recess. Such curvilinear shape will be a complex shape, with multiple radii of curvature along its extension, in order to maintain the depth of penetration of the ball in the recess sufficiently constant to provide smooth operating characteristics in the joint throughout the range of joint articulation required for use in an automotive tilt-steering system, that is, up to approximately at least 35° from the central axis of the joint. Preferably, the curvilinear shape is cylindrical at the open end in the joint to permit the outer joint member, including its recesses, to be formed by a cold forming operation. The preferred embodiment of the universal joint of the invention utilizes a pair of spherical roller balls, and these balls are in contacting relationship with one another with their centers located at 180° with respect to each other in a plane extending along the central axis of the joint and through the ball engaging recesses of the outer joint member. Additionally, the inner surface, along an axial plane at right angles to the plane through the ball engaging recesses of the outer joint member, has a circular arc. The inner surface engages a complemental surface of the inner joint member in surface to surface contact to permit compressive loads to be applied to the joint members and to permit the joint members to be articulated with respect to one another in an arc lying in an axial plane at right angles to the plane of articulation through the ball engaging recesses of the outer plane, as well as in an arc lying in the axial plane through such recesses.

Accordingly, it is an object of the present invention to provide an improved universal joint.

More particularly, it is an object of the present invention to provide a universal joint that is capable of operating with low-lash or free-play at all angular positions of the drive member of the joint relative to the driven member of the joint.

More particularly, it is an object of the present invention to provide a universal joint that is capable of operating smoothly at all angular positions of the drive member of the joint relative to the driven member of the joint in an automotive tilt-steering system..

More particularly, it is an object of the present invention to provide a smoothly operating universal joint for an automotive tilt-steering system which is capable of articulating freely, with little manual effort required on the part of the vehicle drive, to effect tilting of the wheel.

More particularly, it is an object of the present invention to provide a universal joint for an automotive tilt-steering system in which the joint in capable of accepting compressive end loads between the members of the joint.

It is also an object of the present invention to provide a universal joint for an automotive tilt-steering system of the type which utilizes spherical roller balls to transmit torque between inner and outer members and in which the balls are in direct contact with one another.

It is also an object of the present invention to provide a universal joint for an automotive tilt-steering system that can be manufactured at low cost and that can be adapted, because of the low volume of space that it occupies, to a wide range of tilt-steering systems.

It is also an object of the present invention to provide a universal joint of the type which utilizes spherical balls to transmit torque between inner and outer joint members, in which the articulation of the inner and outer joint members permits and results from the rolling of the balls in recesses of the outer joint member and in which the penetration of each ball into each such recess remains substantially constant throughout the articulation of the joint to maintain the contacting members of the joint in contact with one another for smooth operation of the joint.

It is also an object of the present invention to provide a universal joint in which the outer joint member contains ball-engaging recesses which are curvilinear over a substantial portion of their depth and which can be formed by cold forming.

Further objects of the present invention will be apparent from the drawing and the following description thereof, from the detailed description of the invention, and from the appended claims.

DETAILED DESCRIPTION OF THE PREFERRED EMBODIMENT

Figure 1:
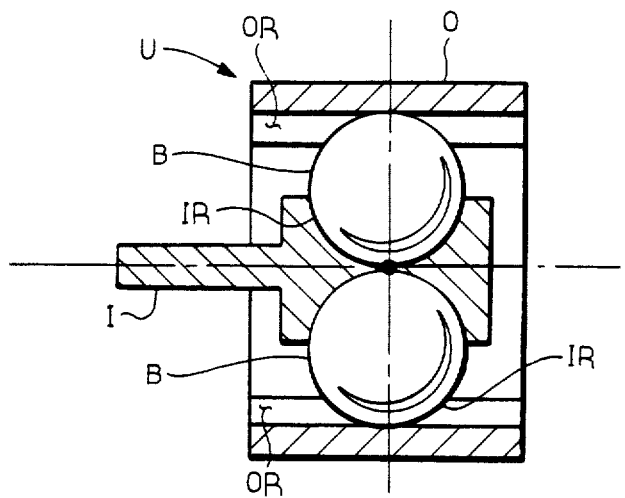
FIG. 1 is a schematic view of a constant velocity universal joint in which the joint members are axially aligned with one another.

The schematic arrangement depicted in FIG. 1 includes a universal joint, generally indicated by reference letter U. The universal joint U includes an inner joint member I and an outer joint member O. Power or torque is transmitted between the inner joint member I and the outer joint member O, for example, from the inner joint member I to the outer joint member O, through a pair of spherical roller balls B. The balls B are engaged partly in recesses IR in the inner joint member I and partly in rectilinear recesses OR in the outer joint member O and are free to roll within such recesses IR and OR, respectively.

Figure 2:
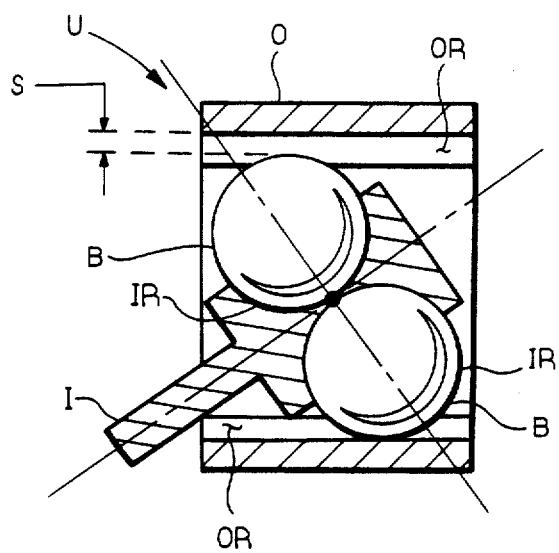
FIG. 2 is a schematic view of the constant velocity universal joint of FIG. 1 after the joint members have been articulated with respect to one another.

The plane through the centers of the spherical balls B, and at right angles to the drawing page in a two-ball universal joint, is normally at right angles to the central axis of the inner joint member 1, and it will also be at right angles to the central axis of the outer joint member O when the inner joint member 1 and the outer joint member O are co-axial, as is shown in FIG. 1, However, when the inner joint members I has been articulated with respect to the outer joint member O, as is shown in FIG. 2, the aforesaid plane through the centers of the ball will rotate through an arc with respect to the central axis of the outer joint member O, and this will cause the point of maximum projection of one of the balls, shown as the upper ball in FIG. 2, to reduce the depth of its penetration into the rectilinear recess OR by some finite distance identified as S in FIG. 2. In the worst case, all of the opening up between the spherical balls B and the rectilinear recesses OR will occur at the location of one rectilinear recess OR, because the inner joint member I is free to move up and down with respect to the outer joint member O under the influence of torque or other loads to which it is subjected. Any such opening up of the joint during articulation will permit the normally contacting elements of the universal joint U to separate from one another, and will detract from the free-play transmission of torque between the inner joint member I and the outer joint member O, thus limiting joints with cylindrical outer rectilinear recesses OR, as shown in FIGS. 1 and 2, to approximately 8° of low-lash articulation in each direction.

Figure 3:
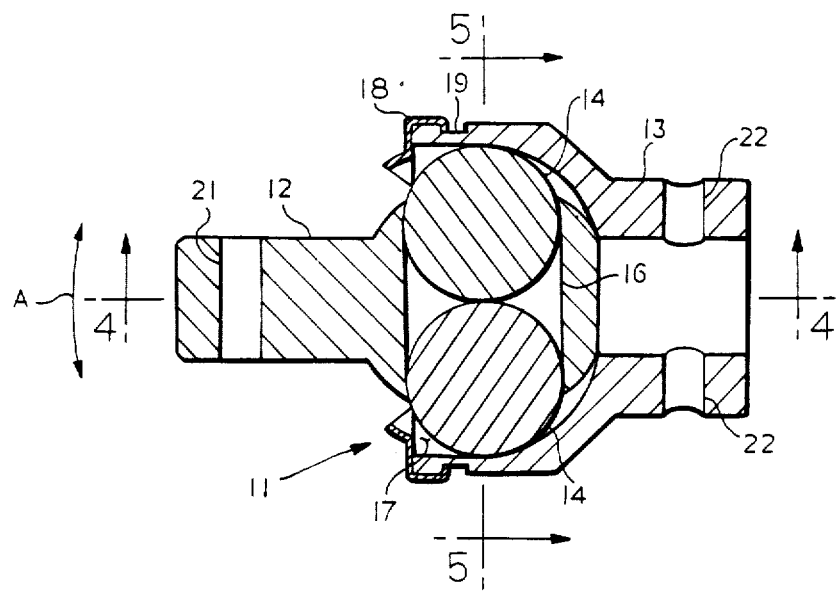
FIG. 3 is an elevational section view of a preferred embodiment of a constant velocity universal joint according to the present invention.
Figure 4:
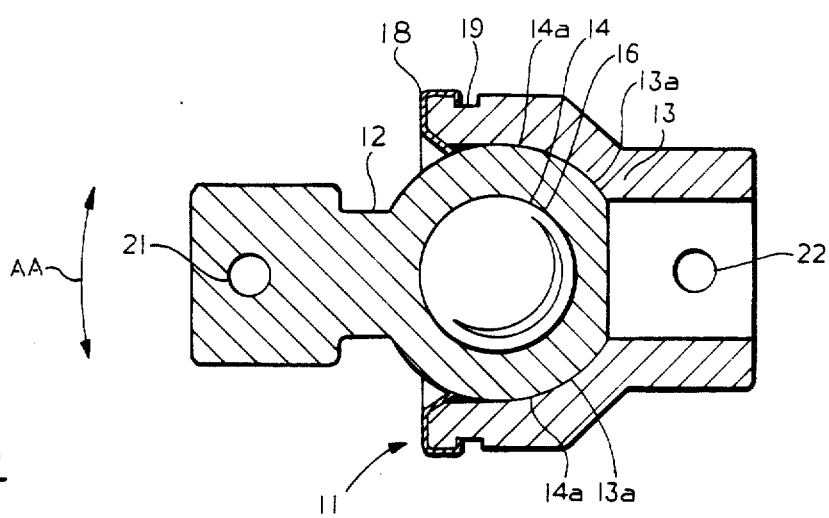
FIG. 4 is a sectional view taken along line 4—4 of FIG. 3.
Figure 5:
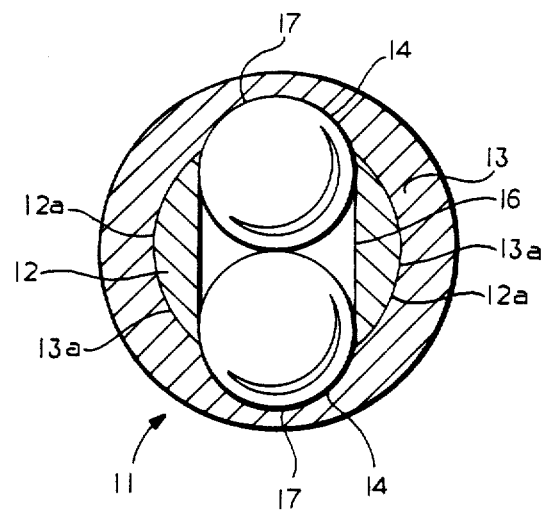
FIG. 5 is a sectional view taken along line 5—5 of FIG. 3.

In the preferred embodiment of the present invention, as is illustrated in FIGS. 3 through 5, there is provided a universal joint, generally indicated by reference number 11. The universal joint 11 includes an inner joint member 12 and an outer joint member 13. The universal joint 11 also includes a plurality, preferably two as shown, of roller balls 14. A greater number of roller balls 14 can be used, if desired, but for low torque transmission universal joints, such as automotive tilt-steering universal joints, two of the roller balls 14 are preferred to minimize the cost of the universal joint. In any case, the centers of the roller balls 14 lie in a plane that extends at a right angle to the central axis of the inner joint member 12 and at a right angle to the drawing. The roller balls 14 are partly contained in a recess 16 that extends through the inner joint member 12 and each ball is partly contained in a recess 17 that extends into the outer joint member 13.

Each roller ball 14 is free to roll or rotate within the recess 16 and within its recess 17, and this rotation is caused by and results from the articulation of the inner joint member 12 with respect to the outer joint member 13 in the direction of the arrow A, as shown in FIG. 3. The universal joint 11 is also free to articulate perpendicularly to the direction of articulation depicted in FIG. 3, as is shown by the direction of the arrow AA in FIG. 4. This articulation is obtained by providing the inner joint member 12 and the outer joint member 13 with complemental matching spherical surface portions 12a and 13a, respectively, as is shown most clearly in FIG. 4 and 5. The surface-to-surface contact between the surface portions 12a and 13a also enables the universal joint 11 to operate satisfactorily when subjected to compressive or end loads between the inner joint member 12 and the outer joint member 13.

As is shown most clearly in FIG. 3, each recess 17, in the axial plane that extends through such recess, has a curvilinear configuration that reduces its radial extent, as measured from the central axis of the outer joint member 13, as the recess progresses from the inner joint member side of the outer joint member rearwardly into the outer joint member. This curvilinear configuration is designed to provide substantially constant penetration of the roller ball 14 into such recess 17 as the inner joint member 12 and the outer joint member 13 articulate with respect to one another in the direction of arrow A. This will maintain the contact between the roller balls 14 and between each roller ball 14 and its respective recess 17, and extend the range of such articulation over which the universal joint 11 will maintain its smooth or low "free play" or "lash" operating characteristics. Preferably, the configuration of the radial extent of the surfaces of the recess 17 will follow a curve of gradually decreasing radii from a maximum radius at the open end of the outer joing member 13, when the inner and outer joint members 12 and 13 are aligned, to a value of approximately 0.64 times such maximum radius at an angle of articulation of 35°. This will help to maintain the roller balls 14 in compression at all positions within the range of articulation for minimum radial lash within the universal joint 11 for maximum smoothness in its operation. This configuration of each of the recesses 17 will also permit the outer joint member to be formed relatively inexpensively, for example, in the case of a metal outer joint 13, by cold forming, and such a configuration will significantly extend the range of articulation of the universal joint 11 without loss of its free-play operating characteristics.

Figure 6:
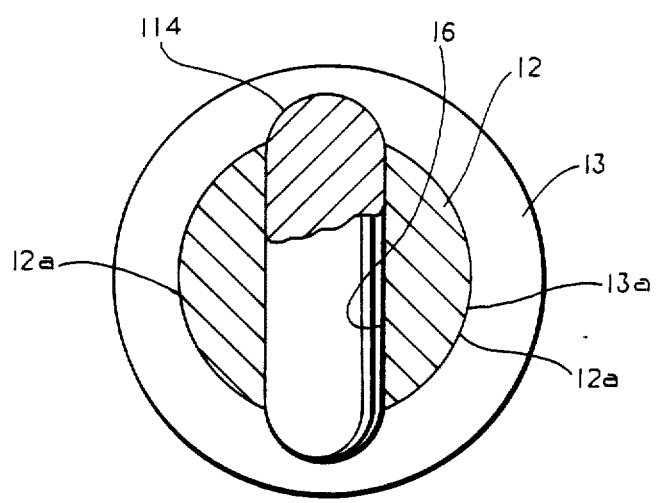
FIG. 6 is a view similar to FIG. 5 showing an alternative embodiment of the present invention.

While a pair of spherical roller balls 14 are preferred for the transmission of torque between the pair of recesses 17 of the outer joint member 13 and the recess 16 of the inner joint member 12, it is to be noted that other mechanical devices can be utilized to perform this torque transmitting function. For example, as is shown in FIG. 6, a single pin 114 with spherical ends could be used, or balls in stacks as shown in U.K. Patent Application No. 2,115,523 could also be used.

In the assembly of the universal joint 11, after the inner joint member 12 and the roller balls 14 have been inserted into the outer joint member 13, they are retained in such position by means of a retaining ring 18 that snaps into a circumferential recess 19 in the exterior of the outer joint member 13. The inner joint member 12, which has a male configuration, has an opening 21 which extends through it and by which it can be connected to a female member, not shown, in the drive train in which the universal joint 11 is utilized. The outer joint member 13, which has a female configuration, also has an opening 22 extending through it. The opening 22 permits the outer joint member 13 to be connected to a male member, not shown, in such drive train. In an automotive tilt-steering system, the universal joint 11 will preferably be utilized with the inner joint member 12 connnected to the drive or steering wheel end of the steering system and with the outer joint member 13 connected to the driven or steering mechanism end of the system.

The various element of the universal joint 11, namely the inner joint member 12, the outer joint member 13, and the spherical roller balls 14 may, of course, be made of steel or other suitable metallic substance. However, the torque loads on a tilt-steering universal joint are relatively low, and where it would be more economical to form one or more of these elements from a non-metallic material, for example a hard, thermosetting polymeric material such as nylon, it is within the contemplation of the inventor that such a material can be utilized without departing from the scope of the invention. In fact, any such material will have a lower modulus of elasticity than steel, and it will, therefore, be easier to maintain the roller balls of the universal joint in compression when they and/or the inner joint member and/or the outer joint member are formed from a non-ferrous material, such as a polymeric material.

The best mode known to carry out the present invention has been described above in terms sufficiently full, clear, concise, and exact as to enable any person skilled in the art to make and use the same. It is to be understood, however, that it is within the inventor's contemplation that certain modifications of the above-described mode of practicing the invention can be made by a skilled artisan without departing from the scope of the invention, and it is, therefore, desired to limit the invention only in accordance with the appended claims.

What is claimed is:

1. A power transmitting mechanical joint comprising, in combination:

a plurality of spherical balls;

an inner joint member comprising recess means therein, said recess means receiving said plurality of sphercial balls, said plurality of spherical balls being rollingly engaged by said recess means to permit each of said plurality of spherical balls to contact another of said plurality of spherical balls, the centers of said spherical balls lying in a plane that is perpendicular to the central axis of said inner joint member; and an outer joint member having an opening that receives a portion of said inner joint member, said opening comprising a plurality of recesses extending thereinto, each of said plurality of recesses rollingly engaging one of said plurality of spherical balls;

said outer joint member of said inner joint member being subject to angular articulation with respect to one another to cause each of said plurality of spherical balls to roll in said recess means in said inner joint member and in said one of said plurality of recesses of said outer joint member that engages said each of said plurality of spherical balls;

the configuration of each of said plurality of recesses of said outer joint member, over at least a major portion of its extent, along a plane that extends through said each of said plurality of recesses and the central axis of said outer joint member, being that of a curve of different radii, gradually decreasing from a maximum radius adjacent said opening of said outer joint member to a lesser radius as said each of said plurality of recesses extends into said opening, said centers of each of said plurality of spherical balls maintaining a substantially constant distance from said curve of different radii such that each of said plurality of spherical balls maintains substantially constant penetration into each of said plurality of recesses of said outer joint member to maintain contact between each of said plurality of spherical balls and another of said plurality of spherical balls and between each of said plurality of spherical balls and each of said recesses of said outer joint member that engages said each of said plurality of spherical balls throughout a range of articulation of said inner joint member with respect to said outer joint member that is substantially greater than 8° and to maintain free play operating characteristics in said joint throughout said range of articulation.

2. The mechanical joint according to claim 1 wherein said configuration of each of said recesses maintains free-play operating characteristics in said mechanical joint throughout said range of articulation of said inner joint member with respect to said outer joint member that is substantially equal to at least 35°.

3. The mechanical joint according to claim 2 wherein said plurality of spherical balls consists of two such balls, the centers of said plurality of spherical balls being located at 180° with respect to one another.

4. The mechanical joint according to claim 3 wherein said outer joint member has a spherical surface portion, wherein said inner joint member has a spherical surface portion, said spherical surface portion of said inner joint member abutting against said spherical surface portion of said outer joint member to permit said inner joint member to be articulated with respect to said outer joint member at right angles to the articulation resulting from the rolling of said plurality of spherical balls in said recesses of said outer-joint member and to permit said inner joint member and said outer joint member to sustain compressive loads therebetween.

5. The mechanical joint according to claim 2 wherein said outer joint member has a spherical surface portion, wherein said inner joint member has a spherical surface portion, said spherical surface portion of said inner joint member abutting against said spherical surface portion of said outer joint member to permit said inner joint member to be articulated with respect to said outer joint member at right angles to the articulation resulting from the rolling of said plurality of spherical balls in said recesses of said outer joint member and to permit said inner joint member and said outer joint member to sustain compressive loads therebetween.

6. The mechanical joint according to claim 1 wherein said plurality of spherical balls consists of two such balls, the centers of said plurality of spherical balls being located at 180° with respect to one another.

7. The mechanical joint according to claim 6 wherein said outer joint member has a spherical surface portion, wherein said inner joint member has a spherical surface portion, said spherical surface portion of said inner joint member abutting against said spherical surface portion of said outer joint member to permit said inner joint member to be articulated with respect to said outer joint member at right angles to the articulation resulting from the rolling of said plurality of spherical balls in said recesses of said outer joint member and to permit said inner joint member and said outer joint member to sustain compressive load therebetween.

8. The mechanical joint according to claim 1 wherein said outer joint member has a spherical surface portion, wherein said inner joint member has a spherical surface portion, said spherical surface portion of said inner joint member abutting against said spherical surface portion of said outer joint member to permit said inner joint member to be articulated with respect to said outer joint member at right angles to the articulation resulting from the rolling of said plurality of spherical balls in said recesses of said outer joint member and to permit said inner joint member and said outer joint member to sustain compressive loads therebetween.

9. The power transmitting mechanical joint according to claim 1, wherein said outer joint member is formed from metal by cold forming.

10. A power transmitting mechanical joint comprising, in combination:

an inner joint member comprising recess means therein, said inner joint member further having a central axis;

an outer joint member comprising a pair of recesses extending thereinto, said outer joint member and said inner joint member being subject to angular articulation with respect to one another; and a pin with spherical ends received in said recess means and extending between said recess means in said inner joint member and said pair of recesses in said outer joint member to transmit torque from one of said inner joint member and said outer joint member to the other of said inner joint member and said outer joint member, the centers of each of said spherical ends of said pin lying in a plane that is perpendicular to the central axis of said inner joint member;

the configuration of each of said pair of recesses of said outer joint member, over at least a major portion of its extent, along a plane that extends through said each of said pair of recesses and the central axis of said outer joint member, being that of a curve of different radii, gradually decreasing from a maximum radius adjacent an opening of said outer joint member to a lesser radius as said each of said pair of recesses extends into said opening, said centers of each of said spherical ends of said pin maintaining a substantially constant distance from said curve of different radii such that each of said spherical ends maintains substantially constant penetration into each of said plurality of recesses of said outer joint member to maintain contact between said pin with said spherical ends and each of said pair of recesses throughout a range of articulation of said inner joint member with respect to said outer joint member that is substantially greater than 8° and to maintain free play operating characteristics in said joint throughout said range of articulation.

11. The power transmitting mechanical joint according to claim 10, wherein said outer joint member is formed from metal by cold forming.

* * * * *

UNITED STATES PATENT AND TRADEMARK OFFICE
CERTIFICATE OF CORRECTION

PATENT NO. : 4,685,897
DATED : August 11, 1987
INVENTOR(S) : Werner Krude

Page 1 of 2

It is certified that error appears in the above-identified patent and that said Letters Patent is hereby corrected as shown below:

Column 1, line 7, delete "tion" and insert ---- ting ----.

Column 1, line 40, delete "of", first occurrence, and insert ---- or ----.

Column 2, line 54, delete the period "." and insert a comma ---- , ----.

Column 2, line 67, delete "the" and insert ---- this ----.

Column 3, line 32, delete "drive" and insert ---- driver ----.

Column 4, line 9, delete "section" and insert ---- sectional ----.

Column 4, line 36, delete "1" and insert ---- I ----.

Column 4, line 38, delete "1" and insert ---- I ----.

Column 4, line 39, delete the comma ",", second occurrence, and insert a period ---- . ----.

UNITED STATES PATENT AND TRADEMARK OFFICE
CERTIFICATE OF CORRECTION

PATENT NO. : 4,685,897
DATED : August 11, 1987
INVENTOR(S) : Werner Krude

It is certified that error appears in the above-identified patent and that said Letters Patent is hereby corrected as shown below:

Column 5, line 49, delete "joing" and insert ---- joint ----.

Column 6, line 24, delete "element" and insert ---- elements ----.

Signed and Sealed this

Twenty-first Day of June, 1988

Attest:

DONALD J. QUIGG

*Attesting Officer*    *Commissioner of Patents and Trademarks*